May 17, 1938.  R. L. WELLS  2,117,383
OPHTHALMIC MOUNTING
Filed July 13, 1935   2 Sheets-Sheet 2
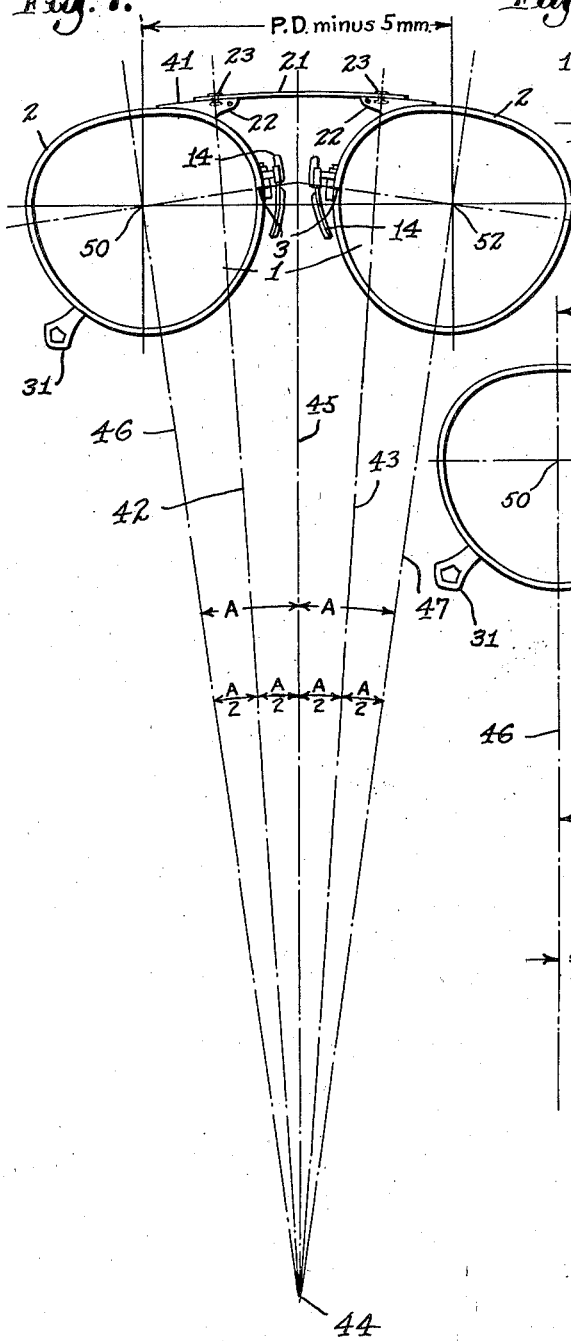
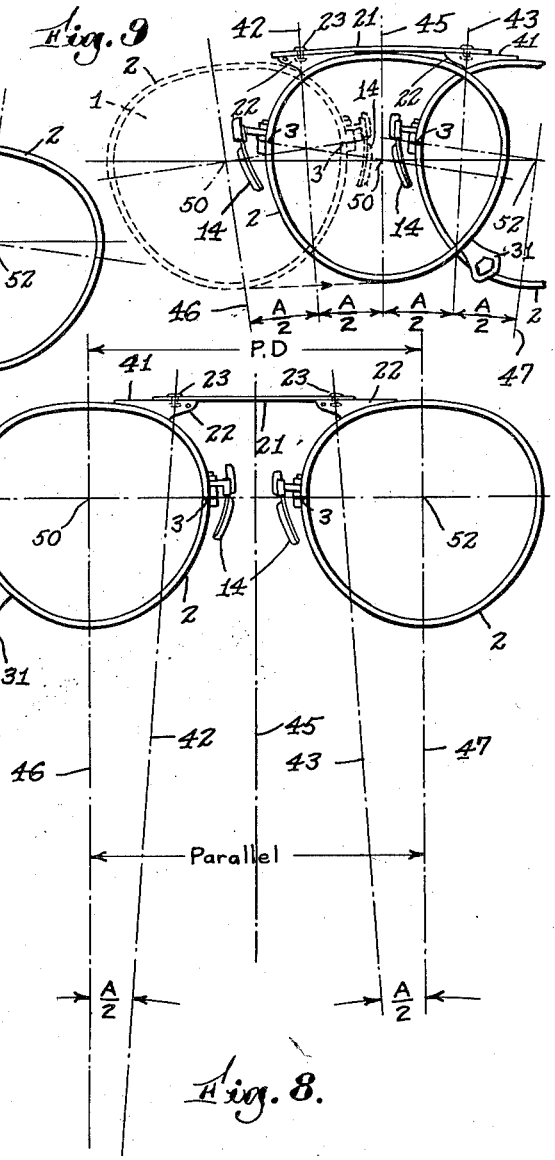
Inventor
RAYMOND L. WELLS
by David Rines
Attorney Patented May 17, 1938

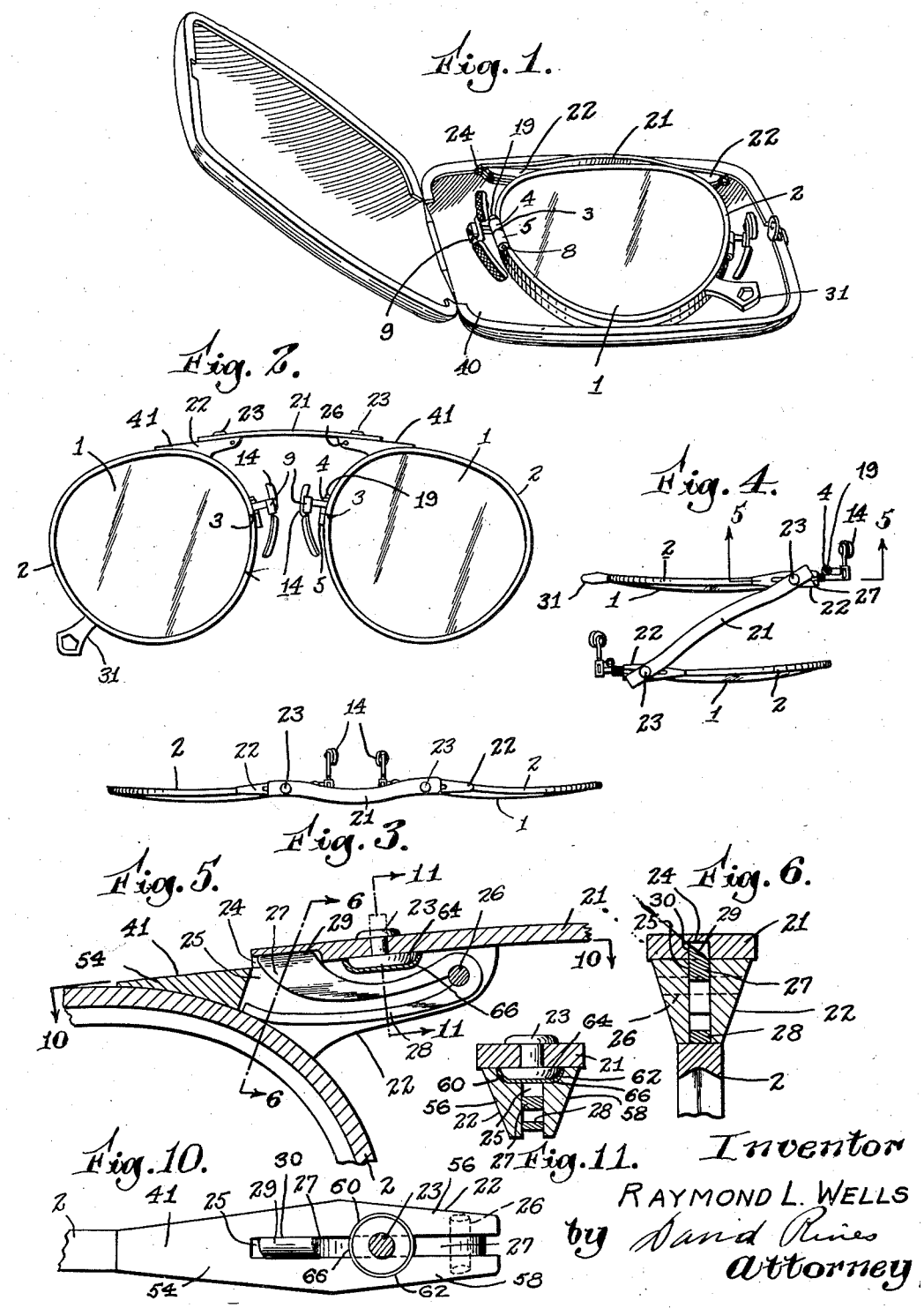

2,117,383

UNITED STATES PATENT OFFICE 2,117,383

OPHTHALMIC MOUNTING

Raymond L. Wells, Attleboro, Mass.

Application July 13, 1935, Serial No. 31,187

34 Claims. (Cl. 88—44)

The present invention relates to ophthalmic mountings, and more particularly to folding oxfords.

A number of different types of folding oxfords have heretofore been proposed, but they all have inherent defects that have consequently limited their use. It has been almost impossible to ensure constancy of pupillary distance in any prior-art oxford. For example, in the type that, up to the present time, has proved to be the least objectionable, the lenses are pivoted to the ends of a highly resilient bridge so as to swing with respect to each other and with respect to the bridge in nearly coincident, substantially parallel planes. By reason of this swinging movement and the resiliency of the bridge, it is possible, by twisting the bridge, to fold one lens behind the other, in compact form. If, in an oxford of this character, the lenses should happen to be spaced apart the right pupillary distance for a particular wearer when they are first fitted, this advantage would soon become lost by reason of the flexing and twisting of the bridge from its normal set during folding, as well as for other reasons. Such flexing and twisting, and the increased strain introduced thereby while the lenses remain in folded position, cause distortion and permanent bending or set of the bridge, which destroys the initial adjustment for pupillary distance. An oxford of this type is not well adapted moreover for use with toric lenses, because, during the swinging of the lenses past each other, the metal rim of one lens has a tendency to rub against, and thus irreparably scratch, the lens in the other rim. According to one of the prior-art proposals, this may be prevented by making the bridge in two parts pivoted with respect to each other at one end and fixed to the respective lenses at the other ends. It is hardly necessary to enlarge upon the impracticability of this proposal as it has gone completely out of use.

It has also been proposed to swing the lenses out of their planes about pivots disposed usually at the ends of the bridge, and sometimes at additional points also. Oxfords of this proposed type and also of the above-described, heretofore approved type, are quite clumsy and impracticable for use with unsymmetrical lenses, for each lens will have parts projecting beyond the boundary of the other to produce an unpleasant contrast when the lenses are folded behind each other. Not only does this increase the space occupied by the folded oxford; it mars the beauty of the folded article. An oxford lends itself to treatment as an article of jewelry, both in precious material and ornamentation of the mounting and its casing, else it will not commend itself to wearers and people will not use it. Complexities of locking the parts in folded position have also been involved.

It is an object of the present invention to provide a new and improved folding oxford, which may be described as of the Z-fold or similar type, the pupillary distance of the lenses of which shall be always fixed; with which it shall be possible to employ toric or any other lenses; which may be snugly and compactly folded so as to occupy a minimum space; which, when folded, shall present an unusually beautiful appearance; the locking mechanism of which for securing the rims, both folded and unfolded, will be exceedingly simple; which shall be provided with an improved hinge; and which shall otherwise be simple in construction, and very effective in use.

Other and further objects and advantages will be explained hereinafter and will be particularly pointed out in the appended claims.

The invention will now be explained in connection with the accompanying drawings, in which:

Fig. 1 is a perspective view showing an ophthalmic mounting embodying the invention in its preferred form, folded in place in a small receptacle;

Fig. 2 is a front elevation showing an ophthalmic mounting embodying the invention in open or usual position;

Fig. 3 is a corresponding top view, with the parts extended for use;

Fig. 4 is a top view showing the parts, partially folded, the two lenses being nearly aligned and parallel with each other;

Fig. 5 is an enlarged longitudinal section through a portion of the bridge and a lens rim showing the pivotal connection of the bridge and the lock for the same, the section being taken upon the line 5—5 of Fig. 4, looking in the direction of the arrows;

Fig. 6 is a cross section showing the lock of the bridge connection, the section being taken on the line 6—6 of Fig. 5, looking in the direction of the arrows;

Fig. 7 is a front elevation, with the parts of the oxford in the "at-rest" position, as shown in Fig. 2, in a setting of explanatory lines, as an aid to an understanding of the pivotal arrangement of the bridge and the lenses in accordance with the present invention;

Fig. 8 is a similar elevation, showing the bridge flexed to the "on-face", substantially straight-line, position corresponding to the positions occupied by the lenses when the oxford is mounted upon the nose;

Fig. 9 is a similar front elevation illustrating the positions occupied by the parts of the left-hand half of the oxford, as shown in Fig. 7, when folded, in full lines, and unfolded, in dotted lines; and Figs. 10 and 11 are sections taken, respectively, upon the lines 10—10 and 11—11 of Fig. 5, looking in the directions of the arrows.

Lenses 1 are shown mounted in lens rims 2, split or divided at 3 and provided with the cooperating hollow elements 4 and 5, the former having a smooth bore and the latter being shown provided with a screw opening 8. A screw 19 may be loosely mounted in the element 4 and threaded in the opening 8 to hold each split rim 2 closed. The invention is not, however, restricted to use with rims 2 of the illustrated type, as other lens-holding means may be employed, including lens clamps of the rimless type; and even where rims are employed, the position of the point 3 of the split-rim connection may be varied.

The rims are each shown provided with a guard-supporting plate 9, carrying a nose guard or pad 14 of any desired type. The lenses are connected by a bridge member 21 and a handle and ribbon connection 31 may be provided. The bridge is preferably constituted of continuous, flat, stiff, but resilient, sheet-spring material, the sheet being sufficiently thin to permit the bridge to be flexed in the vertical plane out of the plane of the sheet, because of its thinness, but sufficiently wide to resist flexing in the horizontal plane, or the plane of the sheet, because of its width.

Each lens-holding member is provided at its upper portion with a bridge-connecting abutment 22. Each abutment has a substantially flat, upper surface 41 substantially tangentially disposed to its respective rim, or to its respective lens, in the case of rimless oxfords. The abutments 22 extend toward each other, and the surface 41 of each abutment 22 is inclined slightly upward toward the opposite abutment 22. The ends of the bridge are disposed in face-to-face contact with the substantially flat surfaces 41. The bridge is substantially straight at and near its ends, so that it extends from each of its ends toward its center without substantial bending, as a substantially straight continuation of the substantially tangentially disposed surfaces 41 of the abutments 22. The bridge is, however, in its normal position, very slightly bent upward, or convexed, as shown in Figs. 2, 7, and 9. By reason of this construction, the bridge is of as short a span as practicable without making it absolutely straight; and its flexing is readily controlled, because it is not practically feasible to move the lenses away from each other more than the exact pupillary distance for which the oxford is designed. This makes it readily possible accurately to true to any desired standard, such as five-millimeters.

As an illustration, the horizontal distance from center 50 to center 52 of the lenses, that is, the pupillary distance, may be 62 millimeters when the glasses are "at rest" as in Fig. 7. When the glasses are "on face", as in Fig. 8, then the said distance will be 5 millimeters more, or 67 millimeters.

The horizontal distance between the centers 50 and 52 is therefore marked, in Fig. 7, "P. D. minus 5 mm.", indicating that it is less, by five millimeters, than the P. D. or pupillary distance, which is the distance between the same centers 50 and 52 in Fig. 8. This five-millimeter truing permits sufficient grip on the nose without excess pressure thereon. Adjustment of the guards offers opportunity to fit various facial differences from normal with this same, five-millimeter truing.

Accurate pupillary distances and, consequently, accurate fitting, is thus readily provided for. This construction further renders it possible to locate the lenses with relation to each other and to the bridge through the medium of the locking joints, as is described elsewhere herein. Because of the better fitting, it is possible also to choose more suitable nose guards, with the assurance that they will always occupy the same, previously adjusted positions, to hold the oxford properly before the eyes. After the optician has adjusted such suitable guards to the nose of the wearer, the bridge will fit exactly right, and the lenses will assume the right position before the eyes, with the centers of the lenses in front of the pupils and with the bridge substantially exactly straightened out, using exactly the right degree of tension required to hold the glasses on the face.

This is a very important feature because, heretofore, as has been generally conceded, it has not been practicable, with any degree of accuracy, to center the lenses of prior-art types of oxfords properly before the eyes of different wearers. In fact, so little accuracy has been attainable, that the practice has been to use the same oxford for a very large variety of different persons.

By flexing the bridge in the vertical plane, the guards may be separated from each other, from the "at-rest" positions illustrated in the said Figs. 2, 7, and 9, to permit them to be placed on the nose; and, when released, the spring of the bridge will position them in the "on-face" position, so as to hold the guards against the nose and hold the mounting in place thereon in the usual manner of spring-bridge mountings, as illustrated in Fig. 8.

The bridge 21 is of such length that it shall lie in substantially a straight line when the oxford is mounted upon the face, in its "on-face" position, thus absolutely fixing the pupillary distance between the centers 50 and 52 of the lenses. It is not possible accidentally to disturb this pupillary distance, because but a small flexing movement is required to straighten the bridge, from the "at-rest" position of Figs. 2, 7, and 9 to the "on-face" position of Fig. 8; and if the optician will choose the right-size bridge for his patient to start out with, the oxford will always fit right and the centers 50 and 52 of the lenses will always be alined with the pupils of the eyes.

Adjacent each end, the bridge 21 is provided with a pivot-post connection 23, pivotally securing the bridge to the abutments 22. The pivot posts 23 are disposed substantially at right angles to the flat surfaces 41. The underside, or concave, side of the bridge end is channeled or recessed at each end, as shown at 24, and the abutment is longitudinally recessed or slotted at 25, the recess 24 and the slot 25 being alined. The abutment 22 is thus constituted of a body portion 54 having the surface 41, and two side portions 56 and 58 extending therefrom at one end thereof and separated by the slot 25. A keeper or lock member 27 is pivoted within the slot 25 of the abutment 22 around a pivot post 26 that extends through the side portions 56 and 58, and has an end projecting through the openings or recesses 24 and 25. By removing the pivot post 26, which is driven in with a friction fit, it is possible easily to replace these keepers 27 when they become old, worn out, broken or otherwise defective. The keeper or lock 27 is made in one piece, or integral, with a blade spring 28, having its free end engaging the rim 2 at the lower end of the slot 25. The spring 28 thus resiliently causes the keeper or lock 27 to extend through the recesses 24 and 25.

The upper faces of the side portions 56 and 58 are disposed in a common plane which merges into the surface 41. The upper face of the side portion 56 is provided with a semi-circular recess 60, and the upper face of the side portion 58 is provided with a semi-circular recess 62. The semi-circular recesses are separated by the slot 25, but they are so disposed as to form, together, a circular recess in which the lower enlarged head 64 of the rivet is soldered at 66. The slot 25 is so narrow, in practice, that the solder 66 bridges the slot 25, as illustrated in Fig. 11. The other end of the pivot 23 is later riveted over against the spring bridge 21, from the dotted-line to the full-line position illustrated in Fig. 5.

The outer end of the keeper 27 is beveled at 29. This beveled face acts as a cam surface to operate the keeper when the bridge 21 is rotated on its pivot 23, thus to permit folding of the oxford in one direction. When the bridge portion 21 is moved towards the left, as viewed in Fig. 6, the right-hand wall of the opening 24 will push against the bevel or cam face 29 of the keeper, and push it downward out of the way, thus allowing the bridge end to move towards the left, about the pivot 23.

At each of the pivots 23, the bridge can, however, move only in that one direction. Referring, again, to Fig. 6, for example, movement of the bridge end towards the right is prevented by the left-hand wall of the channel 24 bearing against the solid shoulder or face 30 of the keeper. The spring keeper thus keeps the bridge and abutments resiliently alined when the mounting is extended for use.

In this manner, the left-hand lens of Fig. 2 may be retained in its original position, in the left hand, say, while the right-hand lens has been drawn downward, by the right hand, as viewed in Fig. 4, and, at the same time, has been drawn around in front of the left-hand lens, to a position separated therefrom, but parallel and substantially alined therewith, as also illustrated in Fig. 4, which suggests the term "Z-fold". From the position shown in Fig. 4, the right-hand lens may now be pushed upward, against the left-hand lens. This is effected without twisting or other distortion of the bridge from its normal set, and no permanent bending or other distortion is introduced to change the normal relation of the various parts. When the two lenses lie thus snugly against each other, with the back of the right-hand lens fitting over the front of the left-hand lens, the bridge lies snugly on top of the rims, extending from abutment 22 to abutment 22 in substantially a horizontal plane across the top of the lenses, and the guards do not interfere with each other, as one is on the right-hand side and the other is on the left. The folded structure is as snug and compact as the two unmounted lenses would fit if laid one on the other, and the folded structure thus occupies a minimum of space. During the folding operation, furthermore, the mounting parts do not interfere with each other. It is not necessary to provide a positive lock to hold the parts together, as they are found to stay folded very effectively by friction alone.

When folded together, the mounting may be placed in a very small receptacle or case 40, hardly larger than a watch. It may be encased in a receptacle as small as 2⅝ x 1⅞ x ¾ inches outside dimensions, occupying about half the space of a man's vest pocket. Because of the small size, it may also be placed in small, highly ornamented or jeweled cases suitable for ladies' hand bags, etc. Likewise, it may be easily carried without a case in the pocket, hand bag, or suspended on a chain or ribbon. It is so compactly fitted together in such a small space that it may be easily and safely handled and stored away.

Another outstanding feature of the present invention is that it permits the use of lenses having odd-shaped contours, and allows the said lenses to be snugly and compactly fitted with each other, causing the contours to be matched with each other when the lenses are in folded relation. This will be understood in connection with Figs. 7 to 9. In Figs. 7 and 9, which show the oxford in the "at-rest" position, without using tension on the spring bridge 21, and as occurs when the oxford is held in place on the nose, the pivot posts 23 are respectively alined with lines 42 and 43 that intersect below the lenses at a point 44 that is disposed on the central line 45 passing through the center of the bridge and with respect to which the bridge and the lenses are substantially symmetrically disposed. Lines passing through the point 44 and the centers of the lenses are indicated at 46 and 47. The line 42 is the bisector of the angle between the lines 45 and 46, and the line 43 is the bisector of the angle between the lines 45 and 47.

When the left-hand lens is pivoted about its pivot 23, therefore, from the dotted-line to the full-line position of Fig. 9, the line 46 through the center of the left-hand lens will coincide with the central line 45; and when the right-hand lens is correspondingly pivoted about the other pivot 23, the line 47 through the center of the right-hand lens will coincide with the same central line 45. When the lenses occupy their folded position, therefore, their centers are exactly alined, one over the other, on the central line 45; and the right-hand side of the right-hand lens will be superposed over the right-hand side of the left-hand lens, and the left-hand side of the right-hand lens over the left-hand side of the left-hand lens. If, therefore, the lenses are of substantially the same size and shape, and if they and the bridge 21 are substantially symmetrically disposed with respect to the center line 45, even though they are not symmetrical with respect to the lines 46 and 47 passing through their respective centers, they will be exactly superposed over each other when folded, without any part of either lens projecting beyond the boundary of the other lens. It is thus possible to select a lens that matches harmoniously the features of the wearer, without the inconvenience of a bulky folded product. The drawings illustrate the "drop-eye" type of lens which blends better into the ordinary face than does the characterless round lens, but which has not heretofore been practicable for use with oxfords.

When the bridge is flexed to the before-described, straight-line position, illustrated in Fig. 8, so as to cause the oxford to assume its "on-face", instead of its "at-rest", position, of course the lines 42, 43, 46, and 47 will no longer meet at the point 44; and if this straight-line position of the bridge were the normal position, the lenses would not be exactly superposed when folded. The bridge 21 is so designed, however, and is so normally shaped, that, when it holds the lenses normally in the "at rest" position, as illustrated in Figs. 2, 7, and 9, the lines 42, 43, 45, 46, and 47 will meet at the point 44. The lenses will then be exactly superposed when folded, as illustrated in Fig. 1.

The position of the point 44 is, of course, determined by the degree of convexity of the bridge 21. If the bridge were normally absolutely straight when not in use, it would be necessary that the lines 42, 43, 45, 46, and 47 should not meet at all but should be parallel, and that the pivot posts 23 or other axes about which the lenses swing should likewise be parallel. In that event, in order to provide the necessary spring tension for holding the oxford upon the nose, however, it would then be necessary to have the lenses diverge outward when worn, instead of having them parallel to each other, as illustrated in Fig. 8. This would destroy the advantages of having the short-span bridge 21, as it would interfere with the fixing of the pupillary distance between the lenses, and with the compact, snug fitting of one lens over the other, as above described, when folded.

Because of the above-described construction, the lenses are always exactly alined, at the exact, required pupillary distance apart, when the short-span bridge is straight, as it is when the oxford is mounted upon the face; and yet the lenses will fold compactly and snugly when not in use.

Because of the higher degree of accuracy of fitting attainable with the present invention, it is desirable to use different-sized bridges for different pupillary distances of different individuals, and to locate the pivot posts 23 on the angle bisectors 42 and 43; and as the positions of these will vary with the individual's pupillary distance, it is necessary to position these pivot posts differently according to the sizes of the lenses and the pupillary distance of the individual wearer. An oxford is thus provided that it is possible to fit properly.

From the foregoing description of the construction and operation of the invention, it will be seen that novel, simple and efficient means have been provided to obtain all the advantages and objects of the invention. The parts fold naturally and without strain or distortion, and move naturally into folded position. They open as naturally and simply, and without complexity. The spring bridge 21 is entirely free from strain because it is nearly always in its normal, undistorted condition,—even when it is in its case 40. It is under spring tension only when in use, on the face, and the amount of strain at that time introduced is negligible. None of the parts is ever twisted or strained, thus eliminating sources of bad fitting and breakage. The constancy of pupillary distance and proper fitting are always assured. The Z-fold is produced smoothly, easily and naturally, without sliding one lens over the other, so that scratching of the lenses through one lens rubbing over the other during folding and unfolding is eliminated. This makes it possible to use toric and other lenses that are not adaptable with the types of oxfords that have heretofore found most favor. The various parts are adjustable without interference from other parts, such as the nose guards. Compactness and smallness of size when folded are always attained, even with the most irregular shaped lenses, thus adding to the beauty, smartness and convenience of the oxford.

It will be understood that the invention is not restricted to the preferred embodiment illustrated and described herein, and modifications and changes may be made by persons skilled in the art without departing from the spirit and scope of the invention, as defined in the appended claims.

What is claimed is:

1. An ophthalmic mounting comprising a bridge adapted to occupy a normal unflexed position and a flexed position, and two lens members the upper portions of which are pivotally connected to the bridge about axes that, when the bridge occupies its normal unflexed position, intersect below the lens members at a point in that line through the center of the bridge with respect to which the bridge and the lens members are substantially symmetrically disposed, the lens members being pivotally immovable with respect to the bridge except about the said axes.

2. An ophthalmic mounting comprising two lenses of substantially the same size and shape and each substantially symmetrical with respect to a center line, and a bridge pivotally connected to the upper portions of the lenses, the bridge normally holding the lenses in extended position such that the center lines intersect at a point below the lenses and such that the lenses and the bridge are substantially symmetrically disposed with respect to a line joining the point to the center of the bridge, and the axes of relative pivotal movement of the bridge and the lenses being substantially alined with the bisectors of the angles between the said joining line and the center lines.

3. An ophthalmic mounting comprising two lenses of substantially the same size and shape and each substantially symmetrical with respect to a center line, a bridge, and two pivot posts pivotally connecting the bridge to the upper portions of the lenses, the bridge normally holding the lenses in extended position such that the center lines intersect at a point below the lenses and such that the lenses and the bridge are substantially symmetrically disposed with respect to a line joining the point to the center of the bridge, and the pivot posts being substantially alined with the bisectors of the angles between the said joining line and the center lines.

4. An ophthalmic mounting comprising two lenses each having an abutment at its upper portion, each abutment having a substantially flat, upper surface substantially tangentially disposed to its respective lens, the abutments extending toward each other, and a bridge of continuous flat, stiff, spring metal the flat ends of which are disposed in face-to-face contact with the said substantially flat surfaces, the bridge extending from each end thereof toward its center without substantial bending as a substantially straight continuation of the substantially tangentially disposed surface of each abutment, each lens being pivotally mounted with respect to the corresponding end of the bridge about an axis substantially at right angles to the corresponding said surface.

5. An ophthalmic mounting comprising two lenses the upper portion of each of which is provided with an abutment, a bridge connecting the abutments to hold the lenses below the bridge, each abutment having a substantially flat surface, the bridge being constituted of continuous stiff, spring-metal slightly convexed at its center but having flat unbent ends disposed in face-to-face contact with the said substantially flat surfaces of the abutments, the ends of the bridge being pivoted to the abutments about axes substantially at right angles to the corresponding flat surfaces of the abutments to render the lenses pivotally movable sidewise with respect to each other about the respective axes into and out of substantial alinement with the bridge, the abutments extending toward each other when the lenses are in the said substantial alinement with the bridge, and means for preventing the flat ends of the bridge from moving out of contact with the respective flat surfaces of the abutments.

6. An ophthalmic mounting comprising two lenses each having a nose guard at one side thereof, each lens having also an abutment at one side of its upper portion above the nose guard, each abutment being provided with a pivot substantially parallel to the plane of its lens, and a bridge connecting the abutments to hold the lenses below the bridge, the bridge being constituted of continuous, flat, stiff, but resilient, sheet-spring material, the bridge being sufficiently thin to permit flexing out of the plane of the sheet but sufficiently wide to resist flexing in the plane of the sheet, the bridge being slightly convexed at its center but being unbent at its ends, the said ends of the bridge being pivotally connected to the respective pivots to render the lenses pivotally movable sidewise with respect to each other about the pivots into and out of substantial alinement with the bridge, the abutments and the nose guards respectively extending toward each other when the lenses are disposed in substantial alinement with the bridge and the bridge then extending continuously, in the said slightly convex form, from abutment to abutment but not beyond the abutments, the length of the bridge between the said ends being such that when the lenses are pivotally folded sidewise about the pivots out of the said substantial alinement, one of the lenses may be caused to become superposed over the other lens with the bridge positioned above the superposed lenses and with the abutments substantially symmetrically positioned with respect to the superposed lenses, the bridge then extending from, but not substantially beyond, the free end of one abutment to, but not substantially beyond, the free end of the other abutment and overlying the upper portions of the superposed lenses, and the nose guards being then positioned at opposite sides of the superposed lenses.

7. An ophthalmic mounting comprising two lenses, a bridge connecting the upper portions of the lenses to hold the major portions of the lenses below the bridge, the ends of the bridge being pivoted to the respective upper portions of the lenses about axes extending in up-and-down directions substantially parallel to the plane of the lenses to render the lenses pivotally movable sidewise with respect to each other about the respective axes into and out of substantial alinement with the bridge, the lenses being pivotally immovable with respect to the bridge except about the said axes, and means disposed adjacent the said upper portions of the respective lenses and cooperating with the respective ends of the bridge to absolutely prevent further pivotal movement of the lenses after they have been moved pivotally into the said substantial alinement with the bridge.

8. An ophthalmic mounting comprising two lenses the upper portion of each of which is provided with an abutment, each abutment being provided with a pivot extending in an up-and-down direction substantially parallel to the plane of its lens, a bridge connecting the abutments to hold the lenses below the bridge, the ends of the bridge being pivotally connected to the respective pivots to render the lenses pivotally movable sidewise with respect to each other about the respective pivots into and out of substantial alinement with the bridge, the lenses being pivotally immovable with respect to the bridge except about the said pivots, and means cooperating with the respective ends of the bridge to yieldingly hold the lenses in the said substantial alinement with the bridge and to absolutely prevent further pivotal movement of the lenses after they have been moved pivotally into the said substantial alinement with the bridge.

9. An ophthalmic mounting comprising two lenses the upper portion of each of which is provided with an abutment, a bridge connecting the abutments to hold the lenses below the bridge, the ends of the bridge being pivoted to the abutments about axes extending in up-and-down directions substantially parallel to the plane of the lenses to render the lenses pivotally movable sidewise with respect to each other about the respective axes into and out of substantial alinement with the bridge, means for preventing the ends of the bridge from moving out of contact with the respective abutments, and means cooperating with the respective ends of the bridge to absolutely prevent further pivotal movement of the lenses after they have been moved pivotally into the said substantial alinement with the bridge.

10. An ophthalmic mounting having lens holding means for use with lenses comprising a pair of lens holding members each having an abutment having a recess, a bridge connecting the abutments to hold the major portions of the lenses, when in position in said lens holding members below the bridge, the bridge being pivoted adjacent its ends to the respective abutments about axes extending in up-and-down directions substantially parallel to the plane of the lenses to render the lenses pivotally movable sidewise with respect to each other about the respective axes into and out of substantial alinement with the bridge, and two keepers separate from the abutments and the bridge, each of which has a portion disposed in the recess in the respective abutments, with the keepers cooperating with the bridge to hold the lenses in the said substantial alinement with the bridge.

11. An ophthalmic mounting comprising two lenses the upper portion of each of which is provided with an abutment having a recess, a bridge connecting the abutments to hold the lenses below the bridge, the ends of the bridge being pivoted to the respective abutments about axes extending in up-and-down directions substantially parallel to the plane of the lenses to render the lenses pivotally movable sidewise with respect to each other about the respective axes into and out of substantial alinement with the bridge, the lenses being pivotally immovable with respect to the bridge except about the said axes, two keepers separate from the abutments and the bridge, one resiliently disposed in each recess, the keepers cooperating with the respective ends of the bridge to hold the lenses yieldingly in the said substantial alinement with the bridge, and a nose guard carried by each lens, the mounting being adapted to be held in place on the face by the nose guards.

12. An ophthalmic mounting comprising two lenses the upper portion of each of which is provided with an abutment having a recess, a bridge connecting the abutments to hold the lenses below the bridge, the ends of the bridge being pivoted to the respective abutments about axes extending in up-and-down directions substantially parallel to the plane of the lenses to render the lenses pivotally movable sidewise with respect to each other about the respective axes into and out of substantial alinement with the bridge, the bridge being constituted of continuous, flat, stiff, but resilient, sheet-spring material, the bridge being sufficiently thin to permit flexing out of the plane of the sheet but sufficiently wide to resist flexing in the plane of the sheet, the bridge being slightly convexed at its center but being unbent at its ends, and means yieldingly disposed in each recess and cooperating with the respective ends of the bridge to hold the lenses yieldingly in the said substantial alinement with the bridge.

13. An ophthalmic mounting comprising two lenses the upper portion of each of which is provided with an abutment having a recess, each abutment being provided with a pivot extending in an up-and-down direction substantially parallel to the plane of its lens, a bridge connecting the abutments to hold the lenses below the bridge, the ends of the bridge being pivotally connected to the respective pivots to render the lenses pivotally movable sidewise with respect to each other about the respective pivots into and out of substantial alinement with the bridge, and two keepers separate from the abutments and the bridge, one disposed in each recess and adapted to be resiliently held therein in a normal position, the respective keepers cooperating with the respective ends of the bridge when the keepers each occupies the said normal position to hold the lenses yieldingly in the said substantial alinement with the bridge.

14. An ophthalmic mounting comprising two lenses each having a nose guard at one side thereof, each lens having also an abutment at one side of its upper portion above the nose guard, each abutment being in substantially the plane of its lens and being rigidly provided with a pivot extending in an up-and-down direction in substantially the said plane of its lens, and a bridge connecting the abutments to hold the lenses below the bridge, the ends of the bridge being pivotally connected to the respective pivots to render the lenses pivotally movable sidewise with respect to each other about the pivots into substantially a common plane in substantial alinement with the bridge and also out of the said common plane, the abutments respectively extending toward each other in substantially the said common plane when the lenses are pivotally moved about the pivots into substantially the said common plane and the bridge then extending continuously from abutment to abutment but not beyond the abutments, the lenses being pivotally immovable with respect to the bridge except about the said pivots, the length of the bridge between the said ends being such that, when the lenses are pivotally folded sidewise about the pivots out of the said substantial alinement, one of the lenses may be caused to become superposed over the other lens with the abutments substantially symmetrically positioned with respect to the superposed lenses, the bridge then extending diagonally above the superposed lenses between the abutments and overlying the upper portions of the superposed lenses, and the nose guards being then positioned at opposite sides of the superposed lenses.

15. An ophthalmic mounting having lens holding means for use with lenses comprising a pair of lens holding members each having a pivot member thereon to be positioned adjacent the upper portion of each lens, a bridge connecting the pivot members to hold the major portions of the lenses below the bridge when the said lenses are in said lens holding members and being pivotally connected to the pivot members about axes extending in up-and-down directions substantially parallel to the plane of the lenses when the said lenses are in said lens holding members to render the lenses pivotally movable sidewise with respect to each other about the respective axes to position the said lenses in substantially superimposed relation with each other in one position and in substantial alignment with the bridge in another position with the said pivots occupying a position spaced from a vertical line passing through the center of the bridge a distance substantially equal to the space of the vertical axes of the respective lenses from said pivots, the said lens holding members being pivotally immovable with respect to the bridge except about the axes of the pivots.

16. An ophthalmic mounting comprising two lenses the upper portion of each of which has a pivot support provided with a recess, a pivot member provided on each support in substantially the plane of its lens, a bridge pivotally connected adjacent its ends to the respective pivots to hold the major portions of the lenses below the bridge and to permit moving the lenses pivotally about the pivot members into alinement with the bridge, and locking members each having a portion disposed in the respective recess and a portion for engaging the bridge to hold the lenses in alinement with the bridge, the locking members each having a spring portion for engaging the supports to hold the locking members yieldingly in engagement with the bridge.

17. An ophthalmic mounting comprising a lens-holding member having an abutment in the form of a box and provided with a recess in a wall of the box, a bridge pivoted to the abutment and provided with a recess that is adapted to be alined with the abutment recess, a keeper mounted in the box and adapted to enter the recesses when the recesses are alined to prevent pivotal movement of the lens-holding member and the bridge, and means tending to maintain the keeper in the recesses when the recesses are alined.

18. An ophthalmic mounting comprising two lens members the upper portion of each of which has a pivot support, a pivot provided on each support and extending substantially parallel to the plane of the corresponding lens member beyond the upper portion of the corresponding lens member, a bridge the ends of which are pivotally connected to the respective pivots to hold the lens members below the bridge, each lens member being freely pivotally movable about its pivot in one direction into substantial alinement with the bridge and also in the opposite direction out of alinement with the bridge, whereby the lens members may be caused to pivot out of the said substantial alinement in the said opposite direction to approach each other sidewise in substantially the form of a Z until the back of one lens member lies substantially against the front of the other lens member, and means for yieldingly holding the lens members in substantial alinement with the bridge and for preventing further pivotal movement of the lens members in the said one direction after they have been moved pivotally in the said one direction into substantial alinement with the bridge.

19. An ophthalmic mounting comprising two lens members the upper portion of each of which has a pivot support provided with a recess, a pivot provided on each support and extending substantially parallel to the plane of the corresponding lens member beyond the upper portion of the corresponding lens member, a bridge the ends of which are pivotally connected to the respective pivots to hold the lens members below the bridge, each lens member being freely pivotally movable about its pivot in one direction into substantial alinement with the bridge and also in the opposite direction out of alinement with the bridge, whereby the lens members may be caused to pivot out of the said substantial alinement in the said opposite direction to approach each other sidewise in substantially the form of a Z until the back of one lens member lies substantially against the front of the other lens member, and locking members yieldingly disposed in the recesses for engaging the bridge to prevent further pivotal movement of the lens members in the said one direction after they have been moved pivotally in the said one direction into substantial alinement with the bridge.

20. An ophthalmic mounting comprising two lens members the upper portion of each of which has a pivot support provided with a recess, a pivot provided on each support and extending substantially parallel to the plane of the corresponding lens member beyond the upper portion of the corresponding lens member, a bridge the ends of which are pivotally connected to the respective pivots to hold the lens members below the bridge, each lens member being freely pivotally movable about its pivot in one direction into substantial alinement with the bridge and also in the opposite direction out of alinement with the bridge, whereby the lens members may be caused to pivot out of the said substantial alinement in the said opposite direction to approach each other sidewise in substantially the form of a Z until the back of one lens member lies substantially against the front of the other lens member, and locking members yieldingly disposed in the recesses for engaging the bridge to prevent further pivotal movement of the lens members in the said one direction after they have been moved pivotally in the said one direction into substantial alinement with the bridge, each locking member having a cam face adapted to be engaged by the bridge upon movement of the lens members in the said opposite direction to release the locking members.

21. An ophthalmic mounting comprising two lens members the upper portion of each of which has a pivot support provided with a recess, a pivot provided on each support in substantially the plane of the corresponding lens member beyond the upper portion of the corresponding lens member, a bridge the ends of which are pivotally connected to the respective pivots to hold the lens members below the bridge, the bridge being constituted of continuous, flat, stiff, but resilient, sheet-spring material, and being sufficiently thin to permit flexing out of the plane of the sheet, and locking members yieldingly disposed in the recesses for engaging the bridge to hold the bridge yieldingly locked to the lens members, each locking member having a cam adapted to be engaged by the bridge upon relative pivotal movement of the bridge and the corresponding lens member to release the corresponding locking member.

22. An ophthalmic mounting comprising two lens members, a bridge above the lens members connecting the lens members, the ends of the bridge being pivoted to the upper portions of the lens members about axes substantially parallel to the plane of the lens members, one of the lens members being freely pivotally movable about its axis in one direction of pivotal movement into substantial alinement with the bridge, means for preventing further pivotal movement of the said one lens member in the said direction after it has been moved pivotally into substantial alinement with the bridge, the other lens member being freely pivotally movable about its axis in the said direction into substantial alinement with the bridge, and means for preventing further pivotal movement of the said other lens member in the said direction after it has been moved pivotally into substantial alinement with the bridge, the lens members being freely pivotally movable out of the said substantial alinement in a direction opposite to the said direction to enable them to approach each other sidewise about their pivots substantially in the form of a Z until the back of one lens member lies substantially against the front of the other lens member.

23. An ophthalmic mounting comprising two lens members, a bridge above the lens members connecting the lens members and extending from each end thereof toward its center without substantial bending at its ends and being bent slightly upward at its center, the said ends of the bridge being pivoted to the upper portions of the lens members about axes substantially parallel to the plane of the lens members, each lens member being freely pivotally movable about its axis in one direction into substantial alinement with the bridge and also in the opposite direction out of alinement with the bridge, whereby the lens members may be caused to pivot out of the said substantial alinement in the said opposite direction to approach each other sidewise in substantially the form of a Z until the back of one lens member lies substantially against the front of the other lens member, the lens members being pivotally immovable with respect to the bridge except about the said axes, and a nose guard carried by each lens member, the mounting being adapted to be held in place on the face by the nose guards.

24. An ophthalmic mounting comprising two lens members, a bridge connecting the lens members above the lens members and extending from each end thereof towards its center without substantial bending at its ends and being bent slightly upward at its center, the said ends of the bridge being pivoted to the upper portions of the lens members about axes substantially parallel to the plane of the lens members, one of the lens members being freely pivotally movable about its axis in one direction of pivotal movement into substantial alinement with the bridge, means for preventing further pivotal movement of the said one lens member in the said direction after it has been moved pivotally into substantial alinement with the bridge, the other lens member being freely pivotally movable about its axis in the said direction into substantial alinement with the bridge, means for preventing further pivotal movement of the said other lens member in the said direction after it has been moved pivotally into substantial alinement with the bridge, the lens members being freely pivotally movable out of the said substantial alinement in a direction opposite to the said direction to enable them to approach each other sidewise about their pivots substantially in the form of a Z until the back of one lens member lies substantially against the front of the other lens member, and a nose guard carried by each lens member, the mounting being adapted to be held in place on the face by the nose guards.

25. An ophthalmic mounting comprising two lens members, a bridge above the lens members connecting the lens members and extending from each end thereof toward its center without substantial bending at its ends and being bent slightly upward at its center, the said ends of the bridge being pivoted to the upper portions of the lens members about axes substantially parallel to the plane of the lens members, one of the lens members being freely pivotally movable about its axis in one direction of pivotal movement into substantial alinement with the bridge, means for preventing further pivotal movement of the said one lens member in the said direction after it has been moved pivotally into substantial alinement with the bridge, the other lens member being freely pivotally movable about its axis in the said direction into substantial alinement with the bridge, means for preventing further pivotal movement of the said other lens member in the said direction after it has been moved pivotally into substantial alinement with the bridge, the lens members being freely pivotally movable out of the said substantial alinement in a direction opposite to the said direction to enable them to approach each other sidewise about their pivots substantially in the form of a Z until the back of one lens member lies substantially against the front of the other lens member, means for yieldingly holding the lens members in alinement with the bridge, and a nose guard carried by each lens member, the mounting being adapted to be held in place on the face by the nose guards.

26. An ophthalmic mounting comprising two lens members, and a bridge connecting the lens members above the lens members and extending from each end toward its center without substantial bending at its ends and being bent slightly upward at its center, the said ends of the bridge extending in the direction of extension of the bridge and being pivoted to the upper portions of the lens members about axes in substantially the planes of the respective lens members, each lens member being freely pivotally movable about its axis in one direction into substantial alinement with the bridge and also in the opposite direction out of alinement with the bridge, whereby the lens members may be caused to pivot out of the said substantial alinement in the said opposite direction to approach each other sidewise in substantially the form of a Z until the back of one lens member lies substantially against the front of the other lens member.

27. An ophthalmic mounting comprising two lenses the upper portion of each of which has a pivot support provided with a recess, a pivot member provided on each support substantially parallel to the plane of its lens, a bridge constituted of stiff, but resilient, sheet-spring material in convex form, and being sufficiently thin to permit flexing out of the plane of the sheet but sufficiently wide to resist flexing in the plane of the sheet, the bridge being provided with a recess at each end on the concave side of the bridge, the bridge being pivotally connected at its ends to the respective pivots to hold the lenses below the bridge and to permit moving the lenses pivotally about the pivot members sidewise into substantial alinement with the bridge, and two separate locking members, one disposed in each pivot-support recess, for yieldingly entering the respective bridge recesses yieldingly to engage the respective ends of the bridge to hold the lenses yieldingly in the said substantial alinement with the bridge.

28. An ophthalmic mounting comprising two lens-holding members each having an abutment provided with a recess, a bridge pivoted at its ends to the abutments and provided at each of its said ends with a recess that is adapted to be alined with the corresponding abutment recess, each lens-holding member being freely pivotally movable in one direction into substantial alinement with the bridge and also in the opposite direction out of alinement with the bridge, whereby the lens-holding members may be caused to pivot out of the said substantial alinement in the said opposite direction to approach each other sidewise until the back of one lens lies substantially against the front of the other lens, and two keepers each adapted to enter one of the abutment recesses and the corresponding bridge recess to prevent further pivotal movement of the lens-holding members in the said one direction after they have been moved pivotally in the said one direction into substantial alinement with the bridge.

29. An ophthalmic mounting comprising two lens-holding members each provided with a recess, a bridge pivoted at its ends to the lens-holding members to hold the lens-holding members below the bridge, the bridge being constituted of continuous, flat, stiff, but resilient, sheet-spring material, the bridge being sufficiently thin to permit flexing out of the plane of the sheet but sufficiently wide to resist flexing in the plane of the sheet, the bridge being slightly convexed at its center but being substantially straight at its ends and being provided at each end of the bridge on the concave side of the bridge with a recess that is adapted to be alined with the recess of the corresponding lens-holding member, and means adapted to enter each bridge recess and the recess of the corresponding lens-holding member to limit pivotal movement of the lens-holding members with respect to the bridge.

30. An ophthalmic mounting comprising two lens members the upper portion of each of which has a pivot support provided with a recess, a pivot provided on each support and extending substantially parallel to the plane of the corresponding lens member beyond the upper portion of the corresponding lens member, a bridge the ends of which are pivotally connected to the respective pivots to hold the lens members below the bridge and provided at each of its said ends with a recess that is adapted to be alined with the corresponding pivot-support recess, the bridge being constituted of stiff, but resilient, sheet-spring material and being sufficiently thin to permit flexing out of the plane of the sheet, and locking members separate from the pivot supports and the bridge, one resiliently disposed in each pivot-support recess and adapted to enter the corresponding bridge recess when alined with its pivot-support recess, the walls of the bridge recesses then cooperating with the locking members to hold the bridge yieldingly locked to the lens members.

31. An ophthalmic mounting comprising two lens-holding members each provided with a recess, a bridge connecting the upper portions of the lens-holding members to hold the lens-holding members below the bridge, the ends of the bridge being pivoted to the respective upper portions of the lens-holding members to render the lens-holding members pivotally movable sidewise with respect to each other into and out of substantial alinement with the bridge, the bridge being constituted of continuous, flat, stiff, but resilient, sheet-spring material, the bridge being sufficiently thin to permit flexing out of the plane of the sheet but sufficiently wide to resist flexing in the plane of the sheet, the bridge being slightly convexed at its center but being unbent at its ends, and means in the respective recesses and cooperating with the respective ends of the bridge to absolutely prevent further pivotal movement of the lens-holding members after they have been moved pivotally into the said substantial alinement with the bridge.

32. An ophthalmic mounting comprising two lenses the upper portion of each of which has a pivot support provided with a recess, a pivot member provided on each support substantially parallel to the plane of the corresponding lens beyond the upper portion of the corresponding lens, a bridge the ends of which are pivotally connected to the respective pivot members to hold the lenses below the bridge, each lens being freely pivotally movable about its pivot into substantial alinement with the bridge, each end of the bridge being provided with a recess, and two locking members separate from the pivot supports and the bridge, one resiliently disposed in each pivot-support recess, for yieldingly entering the respective bridge recesses to hold the lenses yieldingly in the said substantial alinement with the bridge.

33. An ophthalmic mounting comprising two lenses the upper portion of each of which is provided with an abutment having a recess, each abutment being provided with a pivot extending in an up-and-down direction substantially parallel to the plane of its lens, a bridge connecting the abutments to hold the lenses below the bridge, the ends of the bridge being pivotally connected to the respective pivots to render the lenses pivotally movable sidewise with respect to each other about the respective pivots into and out of substantial alinement with the bridge, and two keepers separate from the abutments and the bridge, one resiliently disposed in each recess, the keepers cooperating with the respective ends of the bridge to hold the lenses yieldingly in the said substantial alinement with the bridge, each keeper having a cam face, and the respective ends of the bridge having means adapted to be engaged by the respective cam faces to release the keepers upon movement of the lens members in one direction.

34. An ophthalmic mounting having lens-holding members for use with lenses comprising a pair of lens-holding members each having a pivot support provided with a recess to be positioned adjacent the upper portion of each lens, a pivot member provided on each support in substantially the plane of the lens when in position in its lens-holding member, a bridge pivotally connected adjacent its ends to the respective pivot supports on the lens-holding members to hold the major portions of the lenses, when in position in said holding members, below the bridge to permit moving the said lenses pivotally about the pivot members into substantial alinement with the bridge and a locking member mounted in each of the recesses and having a portion extending outwardly thereof and associated with the bridge for engaging the bridge to hold said lenses, when in position in the holding members, in substantial alinement with said bridge, the locking members each having a spring portion engaging the supports to hold the locking members yieldingly in engagement with the bridge.

RAYMOND L. WELLS.